(12) United States Patent
Kobayashi

(10) Patent No.: US 7,374,687 B2
(45) Date of Patent: May 20, 2008

(54) METHOD OF DECOLORIZING STOCK-RAISING TREATMENT WATER

(75) Inventor: Isamu Kobayashi, Chiba (JP)

(73) Assignee: IK Shoji Co., Ltd., Chiba (JP)

( * ) Notice: Subject to any disclaimer, the term of this patent is extended or adjusted under 35 U.S.C. 154(b) by 268 days.

(21) Appl. No.: 11/178,479

(22) Filed: Jul. 12, 2005

(65) Prior Publication Data

US 2006/0011554 A1 Jan. 19, 2006

(30) Foreign Application Priority Data

Jul. 13, 2004 (JP) .............................. 2004-206112

(51) Int. Cl.
*C02F 1/56* (2006.01)
*C02F 1/28* (2006.01)

(52) U.S. Cl. ...................... 210/666; 210/667; 210/691; 210/694; 210/714; 210/721; 210/727; 210/917

(58) Field of Classification Search .................. 210/917
See application file for complete search history.

(56) References Cited

U.S. PATENT DOCUMENTS

| | | | | |
|---|---|---|---|---|
| 3,252,899 A | * | 5/1966 | Rice et al. .................. | 210/666 |
| 3,977,966 A | * | 8/1976 | Pradt et al. .................. | 588/316 |
| 4,668,404 A | * | 5/1987 | Walterick, Jr. .............. | 210/666 |
| 4,710,298 A | * | 12/1987 | Noda et al. .................. | 210/505 |
| 4,790,943 A | * | 12/1988 | Dunn et al. .................. | 210/705 |
| 5,695,647 A | * | 12/1997 | Carbonell et al. ........... | 210/724 |
| 5,861,100 A | | 1/1999 | Nagasaki et al. | |
| 6,261,459 B1 | * | 7/2001 | Waldmann .................. | 210/666 |
| 6,319,412 B1 | * | 11/2001 | Reyna ......................... | 210/666 |

FOREIGN PATENT DOCUMENTS

| | | |
|---|---|---|
| JP | 59-179200 A | 10/1984 |
| JP | 02-293087 A | 12/1990 |
| JP | 2003-205298 | 7/2003 |
| WO | WO 00/73220 A1 | 12/2000 |

* cited by examiner

*Primary Examiner*—Peter A. Hruskoci
(74) *Attorney, Agent, or Firm*—Westerman, Hattori, Daniels & Adrian, LLP.

(57) ABSTRACT

A decolorization treatment method in which not only can a liquid that has been obtained by treating raw water that is stock-raising treatment water in a purifier tank be decolorized swiftly with simple equipment, but moreover the treatment water can be purified to an extent that reuse as a washing liquid or the like is possible. The method of decolorizing stock-raising treatment water comprises adding ferric polysulfate and a nonionic or anionic organic coagulant to a filtrate that has been obtained by treating raw water that is stock-raising treatment water in a purifier tank, and agitating the obtained product to bring about reaction and thus separate into solid and liquid components, and removing the solid component. Preferably, a two-stage reaction is carried out in which the ferric polysulfate is added and agitation is carried out to bring about reaction, and then the nonionic or anionic organic coagulant is added thereafter.

2 Claims, 8 Drawing Sheets

METHOD OF DECOLORIZING STOCK-RAISING TREATMENT WATER

BACKGROUND OF THE INVENTION

1. Field of the Invention

The present invention relates to a method of decolorizing stock-raising treatment water discharged from a livestock barn or the like.

2. Description of the Related Art

With stock-raising treatment water discharged from a livestock barn (hereinafter referred to as 'raw water'), a method is adopted in which the raw water is stored in a raw water tank, is fed therefrom into a solid-liquid separator using a pump, and is separated into a solid component such as feces and a liquid component, each of which is then treated. With a sieve shaker type or sloping screen type solid-liquid separation system that has been used with wastewater treatment apparatuses using a conventional activated sludge method, a sloping mesh screen is placed in a sloping opening of a hopper-like wastewater receiver, raw water containing excrement is fed using a pump onto an upper part of the sloping mesh screen, and is made to drop down along the sloping mesh screen, whereby a liquid component drops down through the mesh of the screen and is temporarily held in a filtrate tank from the hopper-like wastewater receiver, before being fed to the next treatment step, for example an aeration tank. The solid component, on the other hand, runs along the screen, and drops down into a solid component housing pitch from a lower edge of the screen and is accumulated. In the aeration tank, aeration is carried out with an aerator, and sludge in the wastewater is decomposed by activated sludge microbes. In general, a fixed type aerator is provided in the aeration tank, and minute bubbles are blown into the wastewater by this aerator, the inside of the tank is agitated at a fixed flow speed to make the dissolved oxygen concentration in the tank constant, and the activated sludge microbes are thus cultured so as to treat the wastewater.

Moreover, with conventional treatment equipment, decolorization treatment is carried out before the treated water is discharged into a public drain. Before color removal, the treatment liquid is a brown suspension, with the suspended matter containing fine fibrous matter, which clogs filters, and causes troublesome problems to remain in subsequent treatment. Conventional decolorization treatment involves an operation such as blowing in ozone, using a large amount of activated charcoal, or passing through an osmosis membrane, and to obtain a sufficient transparency, a considerable amount of ozone or activated charcoal and a considerable treatment time are required. Incidentally, with a method disclosed in Japanese Patent Application Laid-open No. 2003-205298 ('Treatment apparatus for wastewater containing livestock urine', laid open Jul. 22, 2003), as shown in FIG. 10, treatment water that has been treated in a membrane treatment part is sucked by a suction pump 142 and thus fed via a transfer pipe $l_{15}$ into a filtrate water tank 108 that is provided next to a sludge storage tank 107 that is adjacent to a membrane separation tank 106, and then the filtered treatment water is fed into a decolorization treatment part 150 via a transfer pipe $l_{16}$, and decolorization treatment is carried out to make the wastewater close to colorless and transparent. A decolorizer 150a constituting the decolorization treatment part 150 is constituted such that the treatment water that has been sucked from the filtrate water tank 108 is fed by a membrane supply high pressure pump 151 to a membrane module 152 having a reverse osmosis membrane, and the treatment water is decolorized by the reverse osmosis membrane which is washed with a chemical solution for washing by a chemical-injecting pump 154 from a chemical solution tank 153. In FIG. 10, $l_{17}$ is a permeated liquid transfer pipe, $l_{18}$ is a circulating water pipe, $l_{19}$ is a concentrated water transfer pipe, and $l_{20}$ is a washing water supply pipe. In this way, hitherto decolorization treatment has required large-scale equipment and a long treatment time, but even so sufficient effects have not been obtained.

SUMMARY OF THE INVENTION

A problem to be solved by the present invention is to provide a decolorization treatment method according to which not only can a liquid that has been obtained by treating raw water that is stock-raising treatment water in a purifier tank be decolorized swiftly with simple equipment, but moreover the treatment water can be purified to an extent that reuse as a washing liquid or the like is possible.

A method of decolorizing stock-raising treatment water of the present invention comprises the steps of adding ferric polysulfate and a nonionic or anionic organic coagulant to a filtrate that has been obtained by treating raw water that is stock-raising treatment water in a purifier tank, and agitating the obtained product to bring about reaction and thus separate into solid and liquid components, and removing the solid component. Preferably, a two-stage reaction is carried out in which the ferric polysulfate is added and agitation is carried out to bring about reaction, and then the nonionic or anionic organic coagulant is added thereafter.

With the method of decolorizing stock-raising treatment water of the present invention, in the above treatment, it is appropriate to add the ferric polysulfate in an amount such that the concentration thereof becomes 500 to 2,000 ppm, and to add the nonionic or anionic organic coagulant in an amount such that the concentration thereof becomes at least 10 ppm.

Moreover, with the method of decolorizing stock-raising treatment water of the present invention, in the above treatment, it is appropriate to carry out addition of old paper and/or activated charcoal in the first stage reaction in which the ferric polysulfate is added.

With the method of decolorizing stock-raising treatment water of the present invention, by adding ferric polysulfate and a nonionic or anionic organic coagulant to a filtrate that has been obtained by treating raw water in a purifier tank, and agitating the obtained product to bring about reaction, even fine fibrous matter which is the main component of brown suspended matter can be coagulated and thus separated out, and hence there is an outstanding decolorization effect. In addition, because even the fine fibrous matter which causes clogging of filters and so on can be removed, troublesome problems do not remain in subsequent treatment. This effect can be further improved by carrying out a two-stage reaction in which the ferric polysulfate is added and agitation is carried out to bring about reaction, and then the nonionic or anionic organic coagulant is added thereafter.

Moreover, with the method of decolorizing a filtrate of the present invention, by carrying out addition of old paper and/or activated charcoal in the first stage reaction in which the ferric polysulfate is added in the above treatment, not only can the dewatering effect be improved, but moreover the above-mentioned fine fibrous matter can be adsorbed onto the old paper and/or activated charcoal and thus removed, and hence an improved decolorization effect can be obtained.

DESCRIPTION OF THE PREFERRED EMBODIMENTS

Figure 1:
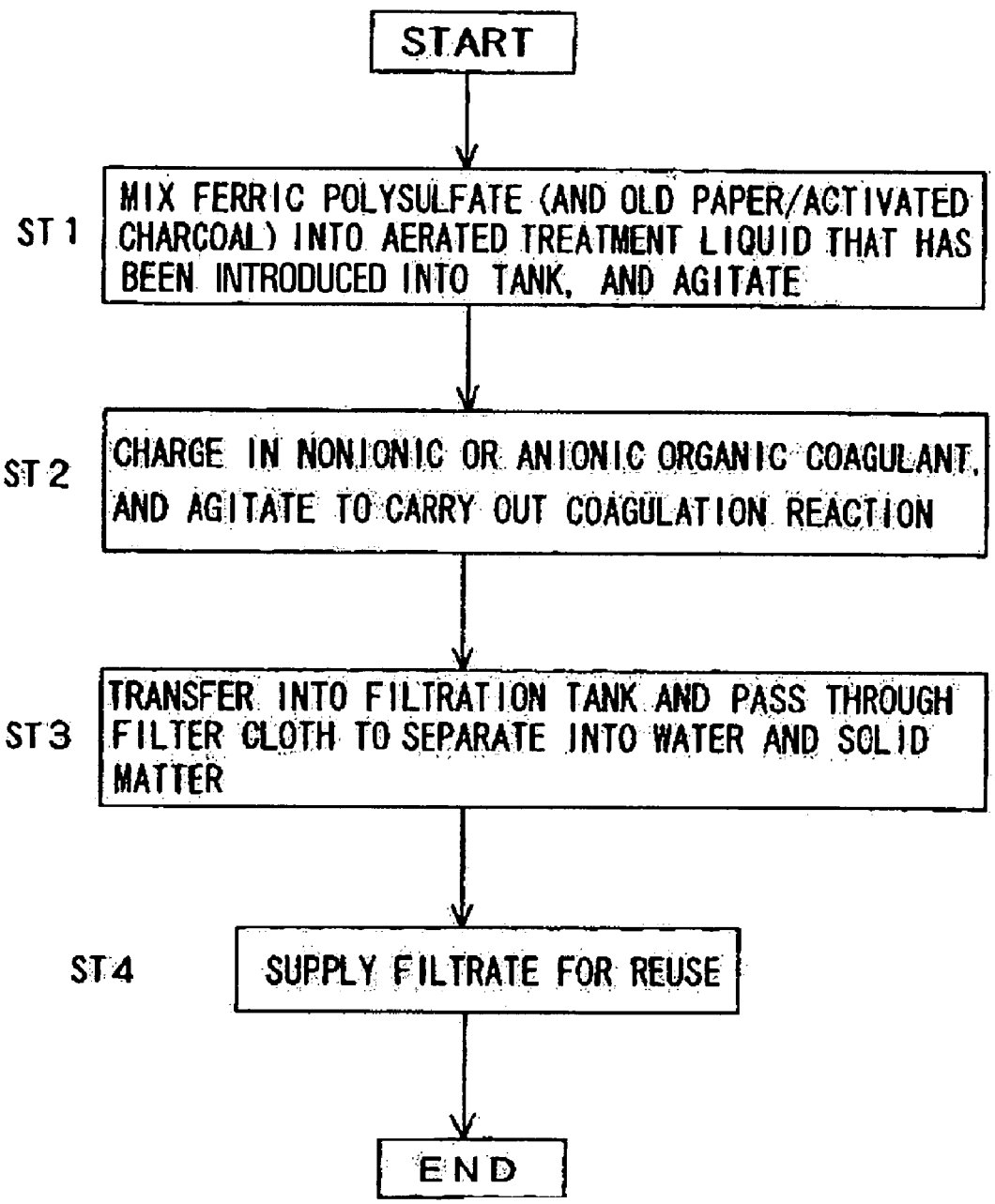
FIG. 1 is a flowchart showing the basis of a decolorization treatment process of the present invention.

The basic flow of a method of decolorizing stock-raising treatment water of the present invention will now be described with reference to FIG. 1. A treatment liquid obtained by carrying out aeration and decomposing using activated sludge microbes is a brown suspension. In step 1, the supernatant of this treatment liquid is drawn off and put into a first treatment tank, ferric polysulfate is added and agitation is carried out to bring about a first stage reaction and separate into a solid component (sludge) and a liquid component. At this time, it is effective to add old paper or activated charcoal. In step 2, the solid/liquid mixture thus obtained is transferred into a second treatment tank, a nonionic (or anionic) organic coagulant is added and agitation is carried out to bring about a second stage reaction and separate into a solid component and a liquid component. In step 3, the solid component (sludge) is filtered off and thus removed using a filter cloth. Through the above simple treatment, the filtrate is dramatically decolorized, and thus purified into a liquid having high transparency.

EXPERIMENT 1

The results of carrying out experiments to find suitable conditions for the method of decolorizing stock-raising treatment water of the present invention are shown below. First, as an experiment to find a suitable amount of ferric polysulfate to be added, seven samples with amounts added of 500, 1000, 1500, 2000, 2500, 3000 and 3500 ppm were made. The results shown in Table 1 were obtained.

TABLE 1

| Sample no. | 1 | 2 | 3 | 4 | 5 | 6 | 7 |
|---|---|---|---|---|---|---|---|
| Amount of F.P. added (ppm) | 500 | 1000 | 1500 | 2000 | 2500 | 3000 | 3500 |
| Amount of F.P. added (mg/l) (after relative density conversion) | 725 | 1450 | 2175 | 2900 | 3625 | 4350 | 5075 |
| PH | 6.6 | 6.2 | 5.9 | 3.9 | 3.5 | 3.2 | 3.1 |
| Polymeric coagulent | | | | NP780 | | | |
| Type of coagulant | | | | Nonionic | | | |
| Amount added (ppm) | | | | 10 | | | |
| Floc production | x | x | Δ | ○ | ○ | ○ | ○ |
| Color removal (transmittance T (%)) | — | — | 56.6 | 78.1 | 58.4 | 40.6 | 29.2 |
| Evaluation | | | | ○ | | | |

NOTE F.P.: ferric polysulfate

In this experiment, reaction was carried out with the ferric polysulfate and the organic coagulant added simultaneously, i.e. without separating the first process of adding the ferric polysulfate and the second process of adding the organic coagulant. Regarding the organic coagulant used here, the conditions were the same for all of the samples, with 10 ppm of the nonionic NP780 (trade name of Dia-Nitrix Co., Ltd.) being used with each sample. Upon increasing the amount of the ferric polysulfate, the pH dropped. With Sample 1, the amount added of the ferric polysulfate was insufficient, and hence solid-liquid separation was insufficient. With Sample 2, separation occurred to some extent, but again the amount added of the ferric polysulfate was insufficient, and hence separation was insufficient, and moreover the transparency of the liquid was low. With Sample 3, the extent of separation was good, but the transmittance of the liquid only became 56.6%. With Sample 4, the extent of separation was good, and the transmittance of the liquid was the best at 78.1%. With Sample 5, the extent of separation was good, but the transmittance of the liquid was somewhat worse at 58.4%. With Sample 6, the extent of separation was so-so, but the transmittance of the liquid was low at 40.6%. With Sample 7, the extent of separation was somewhat poor, and the transmittance of the liquid was poor at 29.2%. From the above results, it is inferred that if the amount added of the ferric polysulfate is too high then the effects worsen, and that a suitable amount is around 2000 ppm. Incidentally, the transmittance of the test water before treatment was 21.7%.

Figure 2:
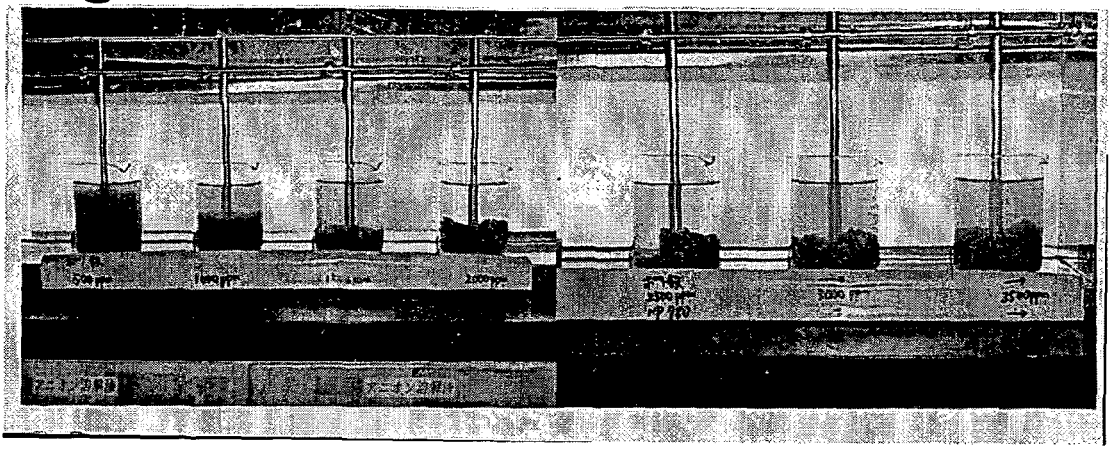
FIG. 2 consists of photographs showing the state of reaction for each sample in the case of carrying out a test into a suitable amount of ferric polysulfate to be added.

The results for the state of separation and color removal are also shown in the photographs of FIG. 2. Since color cannot be used in patent drawings, it is somewhat difficult to appreciate the results from the photographs, but some level of discrimination should be possible.

EXPERIMENT 2

Next, results of carrying out studies to find a suitable pH are shown in Table 2. 10 ppm of the nonionic NP780 (trade name of Dia-Nitrix Co., Ltd.) was used as the organic coagulant, the amount added of the ferric polysulfate was made to be 2000 ppm, which was the amount for which the decolorization effect was greatest according to the previous experimental results, and the pH of the sample was made to be any of five values, i.e. 3.9, 4.5, 5.0, 5.5 or 6.0. The decolorization effects will be described with reference to Table 2. Note that here the pH of the test water before treatment was 8.1, and sodium hydroxide was used to adjust the pH.

TABLE 2

| Sample no. | 8 | 9 | 10 | 11 | 12 |
|---|---|---|---|---|---|
| Amount of F.P. added (ppm) | | | 2000 | | |
| Amount of F.P. added (mg/l) (after relative density conversion) | | | 2900 | | |
| PH | 3.9 | 4.5 | 5.0 | 5.5 | 6.0 |
| Polymeric coagulent | | | NP780 | | |
| Type of coagulent | | | Nonionic | | |
| Amount added (ppm) | | | 10 | | |
| Floc production | ◯ | ◯ | ◯ | ◯ | ◯ |
| Color removal (transmittance T (%)) | 78.0 | 81.3 | 80.0 | 78.8 | 76.9 |
| Dewaterability | ◯ | ◯ | Δ◯ | Δ◯ | Δ |
| Water content after dewatering (%) | 85.2 | 85.4 | 86.8 | 87.8 | 88.2 |
| BOD (mg/l) | ( ) | ( ) | ( ) | ( ) | — |
| COD (mg/l) | | | | | — |
| SS (mg/l) | | | | | — |
| Evaluation | | | ◯ | | |

Figure 3:
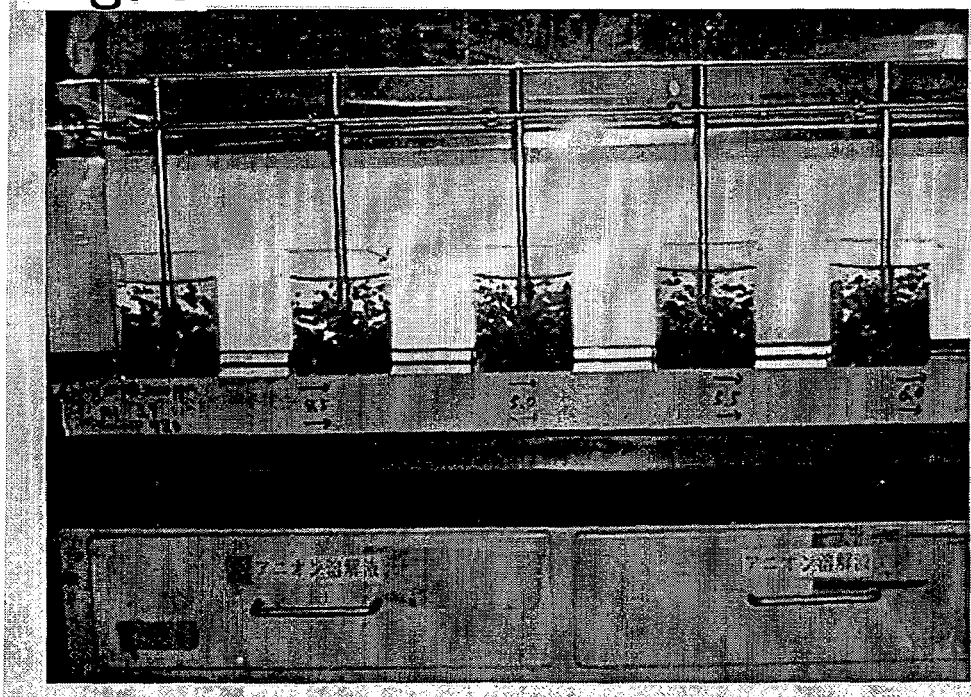
FIG. 3 is a photograph showing the state of reaction for each sample in the case of carrying out a test into the relationship between the reaction and pH.
Figure 4:
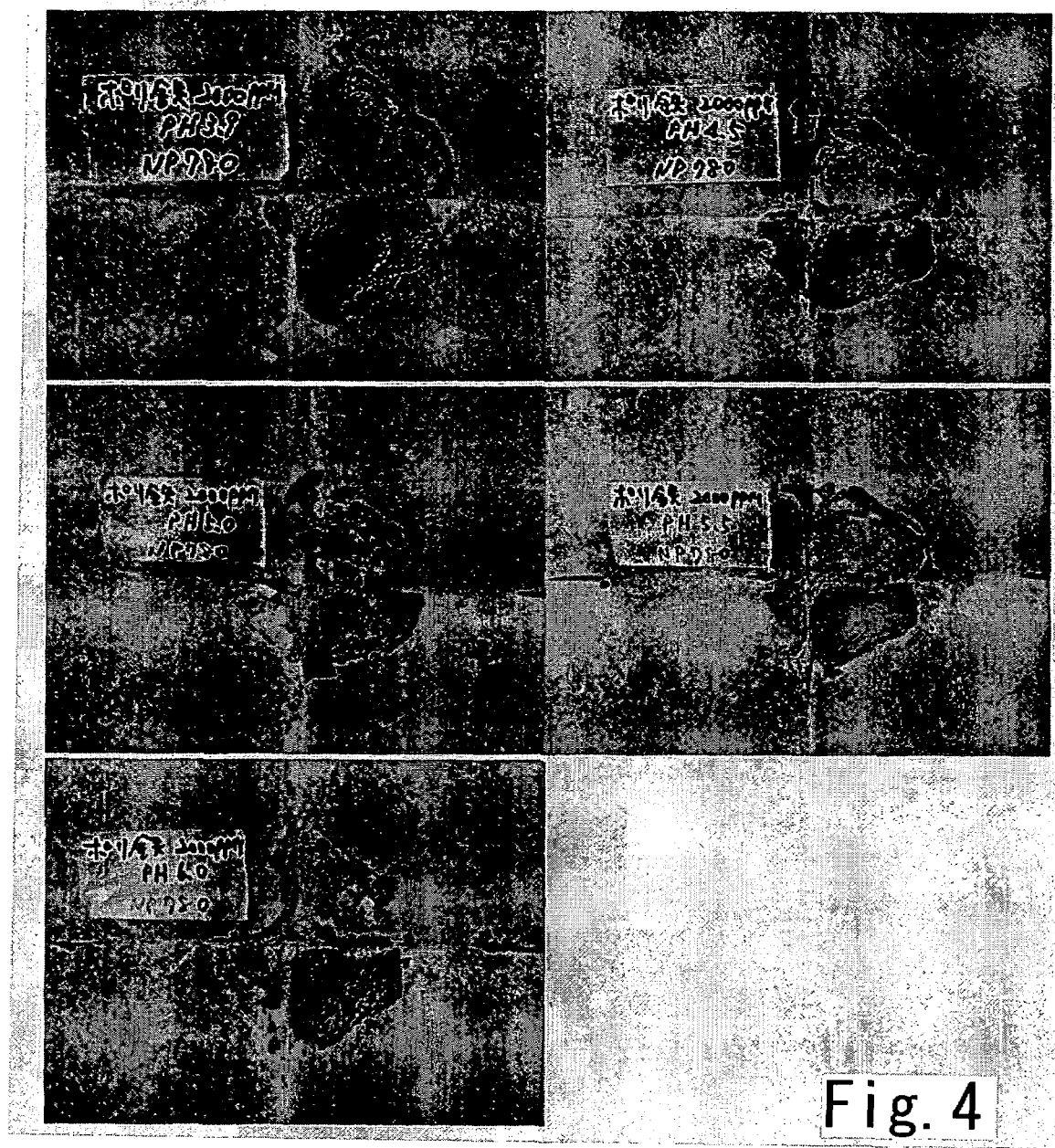
FIG. 4 consists of photographs showing the state of solid remaining on a filter cloth for each sample in the case of carrying out the test into the relationship between the reaction and pH.

Representing the state of color removal by the transmittance, the transmittances for the samples in order were 78.0%, 81.3%, 80.0%, 78.8% and 76.9%. The greatest effect was thus at pH 4.5 with a transmittance of 81.3%, with the transmittance showing a tendency of gradually dropping as the pH was increased above this. FIG. 3 shows the state of separation and color removal. Although there is only about a 5% difference, it can be seen that the pH does affect the decolorization effect. FIG. 4 shows the solid matter (sludge) removed by filtering with a filter cloth after separation. The photographs are of the solid matter after folding the filter cloth fourfold, squeezing with both hands, and then opening out the filter cloth. It can be seen that there is some variation in the state of peeling away from the filter cloth, and it is thought that this corresponds to the water content after dewatering. Incidentally, the water contents in order after pressing for 30 seconds with pressing conditions of 1 kg/cm$^2$ were 85.2%, 85.4%, 86.8%, 87.8% and 88.2%, i.e. the higher the pH, the higher the water content.

EXPERIMENT 3

Figure 5:
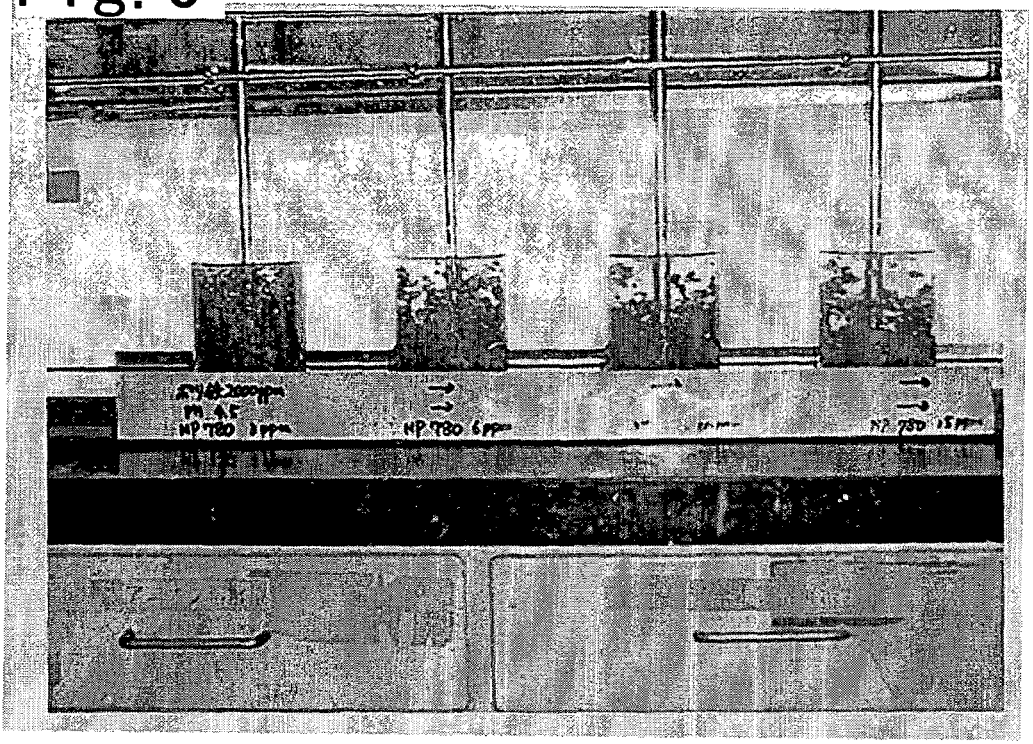
FIG. 5 is a photograph showing the state of reaction for each sample in the case of carrying out a test into a suitable amount of an organic coagulant to be added.

Next, an experiment was carried out to find a suitable value of the amount of the coagulant. In this experiment, the amount added of the ferric polysulfate was made to be 2000 ppm and the pH was made to be 4.5, these being the values for which the decolorization effect was greatest according to the previous experimental results, the nonionic NP780 (trade name of Dia-Nitrix Co., Ltd.) was used as the organic coagulant, and four samples were prepared, with the amount of the coagulant being 3, 6, 10 or 15 ppm. The results are shown in Table 3, and the state of reaction is shown by the photograph in FIG. 5.

TABLE 3

| | Sample no. | | | |
|---|---|---|---|---|
| | 13 | 14 | 15 | 16 |
| Amount of F.P. added (ppm) | | 2000 | | |
| Amount of F.P. added (mg/l) (after relative density conversion) | | 2900 | | |
| PH | | 4.5 | | |
| Polymeric coagulant | | N P 7 8 0 | | |
| Type of coagulant | | Nonionic | | |
| Amount added (ppm) | 3 | 6 | 10 | 15 |
| Floc production | Δ◯ | ◯ | ◯ | ◯ |
| Color removal (transmittance T (%)) | 81.5 | 81.4 | 81.2 | 81.4 |
| Dewaterability | Δ | Δ◯ | ◯ | ◯ |
| Evaluation | | | ◯ | |

Representing the decolorization effect by the transmittance, the transmittances for the samples in order were 81.5%, 81.4%, 81.2% and 81.4%. In terms of the decolorization effect, there was thus little difference, with the transmittance differing between samples by no more than 0.3%. If one is pressed to identify the best value, then the highest transmittance was shown by the sample with the lowest coagulant addition amount of 3 ppm, but comparing the dewaterabilities, the result was not good for the sample with a coagulant addition amount of 3 ppm, and hence this coagulant addition amount is unsuitable. It can also be seen from the photograph of FIG. 5 that separating out of the solid component (sludge) was not good for the sample with a coagulant addition amount of 3 ppm. For the sample with a coagulant addition amount of 6 ppm, the extent of separation was somewhat better, and at 10 ppm the separation was further improved, but there was no great difference between the 15 ppm sample and the 10 ppm sample. Consequently, judging overall considering not only the decolorizability but also the dewaterability and the degree of separation, it can be seen that good results are obtained at 10 ppm or more, and hence the optimum coagulant addition amount was set at 10 ppm.

EXPERIMENT 4

Next, because it is well known that the dewatering effect is improved by adding old paper to the filtrate, the present applicants envisaged carrying out treatment with old paper added during the first stage reaction of adding ferric polysulfate and agitating to separate the solid component (sludge) and the liquid component, and carried out an experiment to find a suitable amount of the old paper. The amount of old paper added is expressed as the weight in kg of the old paper added to 1 m$^3$ of the treatment water. First, there were made to be six samples, with the amount of old paper added being 0, 0.25, 0.5, 1, 2 or 3 kg/m$^3$. In this experiment, the amount added of the ferric polysulfate was made to be 2000 ppm, the pH was made to be 4.5, and the nonionic NP780 (tradename of Dia-Nitrix Co., Ltd.) was used as the organic coagulant.

Figure 6:
FIG. 6 consists of photographs showing the state of reaction for each sample in the case of adding old paper in different amounts.

The results are shown in Table 4, and the state of reaction is shown by the photographs in FIG. 6.

TABLE 4

| Sample no. | 17 | 18 | 19 | 20 | 21 | 22 |
|---|---|---|---|---|---|---|
| Amount of old paper added (kg/m³) | 0 | 0.25 | 0.5 | 1 | 2 | 3 |
| Amount of F.P. added (ppm) | | | 2000 | | | |
| Amount of F.P. added (mg/l) (after relative density conversion) | | | 2900 | | | |
| PH | | | 4.5 | | | |
| Polymeric coagulant | | | NP780 | | | |
| Type of coagulent | | | Nonionic | | | |
| Amount added (ppm) | | | 10 | | | |
| Floc production | ○ | ○ | ○ | ○ | Δ○ | Δ○ |
| Color removal transmittance T (%) | 81.0 | 80.8 | 80.9 | 81.3 | 81.8 | 81.8 |
| Dewaterability | ○ | ○⊚ | ⊚ | ⊚ | ⊚ | ⊚ |
| BOD (mg/l) | — | — | ( ) | ( ) | ( ) | — |
| COD (mg/l) | — | — | | | | — |
| SS (mg/l) | — | — | | | | — |
| Water content after dewatering (%) | 85.5 | 80.8 | 75.6 | 70.9 | 69.4 | 69.1 |
| Evaluation | ○ | ○⊚ | ⊚ | ⊚ | ⊚ | ⊚ |

Figure 7:
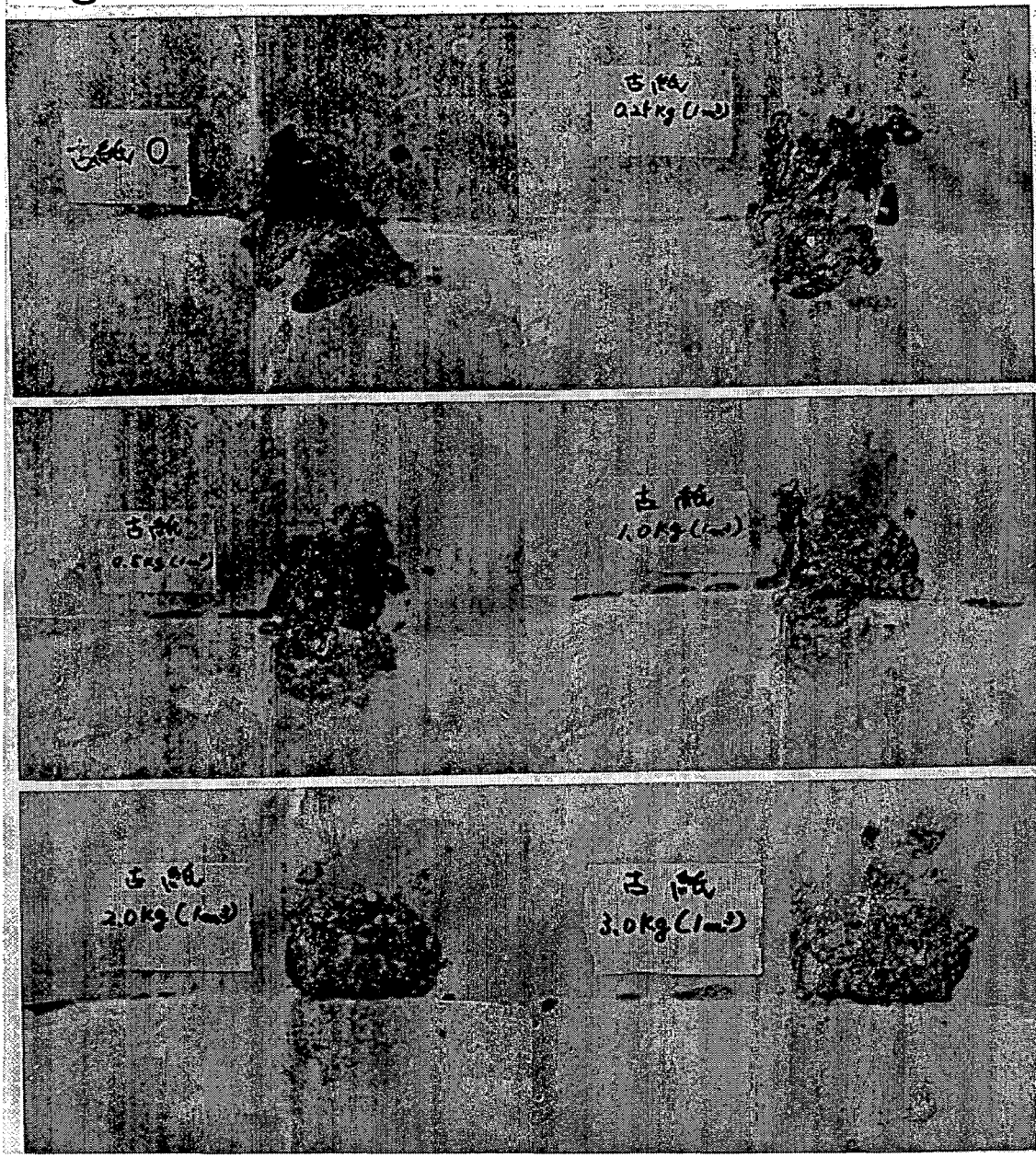
FIG. 7 consists of photographs showing the state of solid remaining on a filter cloth for each sample in the case of adding old paper in different amounts.

Representing the decolorization effect by the transmittance, the transmittances for the samples in order were 81.0%, 80.8%, 80.9%, 81.3%, 81.8% and 81.8%. It thus appears that there is no great difference in terms of the decolorization effect, although it can be seen that the transmittance initially drops upon putting in old paper but then gradually rises as the amount of old paper is increased. It is thought that the transmittance drops from an old paper addition amount of 0 to 0.25 kg/m³ because of the effect of colorants coming out from the old paper itself, but it has been found that thereafter the transmittance improves as the amount of old paper added is increased because a fine fibrous colorant component is adsorbed by the old paper. From FIG. 6 it can be seen that the transparency of the liquid component was good, and it can also be seen that the amount of the solid component increases as the amount of old paper is increased. However, this solid component can easily be removed by passing through a filter cloth, and hence is not a problem whatsoever. Incidentally, the data for the water content after dewatering was 85.5%, 80.8%, 75.6%, 70.9%, 69.4% and 69.1% in the order of the samples. FIG. 7 shows the solid matter (sludge) removed by filtering with a filter cloth after carrying out the separation reaction for each of the samples. As with FIG. 4, the photographs are of the solid matter after folding the filter cloth fourfold, squeezing with both hands, and then opening out the filter cloth. Sticking to the filter cloth is observed, and it can be seen that the state of peeling away of the solid matter is good at 2 kg or more. This state corresponds to the water content after dewatering mentioned above.

EXPERIMENT 5

Moreover, an experiment was carried out in which activated charcoal was added as well as old paper to further improve the decolorization effect. In this experiment, the amount added of the ferric polysulfate was made to be 1500 ppm, the pH was not adjusted in particular since the pH of the test water, which was originally 7.6, became 4.8 upon adding the ferric polysulfate, 15 ppm of the nonionic NP780 (trade name of Dia-Nitrix Co., Ltd.) was used as the organic coagulant, and the amount of the old paper added was made to be 0.3 g for 300 cm³ of the test liquid in a beaker, this converting to 1 kg per 1 m³ of test liquid. Moreover, four samples were used, with the amount of activated charcoal added being made to be 0, 0.3 g, 0.5 g or 0.7 g for the 300 cm³ of the test liquid, this converting to 0, 1, 1.6 or 2.2 kg per 1 m³ of test liquid. The test results are shown in Table 5, and the state of reaction is shown by the photograph in FIG. 8.

TABLE 5

| Thing examined | Filtrate | Filtrate | Filtrate | Filtrate | Raw water |
|---|---|---|---|---|---|
| Old paper added (g/300 cc) | | | 0.3 | | — |
| Activated charcoal added (g/300 cc) | 0 | 0.3 | 0.5 | 0.7 | — |
| Amount of F.P. added (ppm) (without relative density conversion) | | | 1500 | | — |
| Amount of F.P. added (mg/l) (after relative density conversion) | | | 2175 | | — |
| PH | | | 4.8 | | 7.6 |
| Polymeric coagulent | | | NP780 | | — |
| Type of coagulent | | | Nonionic | | — |
| Amount added (ppm) | | | 15 | | — |
| Floc production | ○ | ○ | ○ | ○ | — |
| Color removal (transmittance (%)) | 75 | 86.8 | 88 | 91.5 | 23.8 |
| Evaluation | ○ | ○⊚ | ⊚ | | — |

※Test water: 300 ml (jar test put into a 300 ml glass beaker)
※※Relative density conversion for amount of ferric polysulfate added (mg/l): Calculated taking relative density to be 1.45

Figure 8:
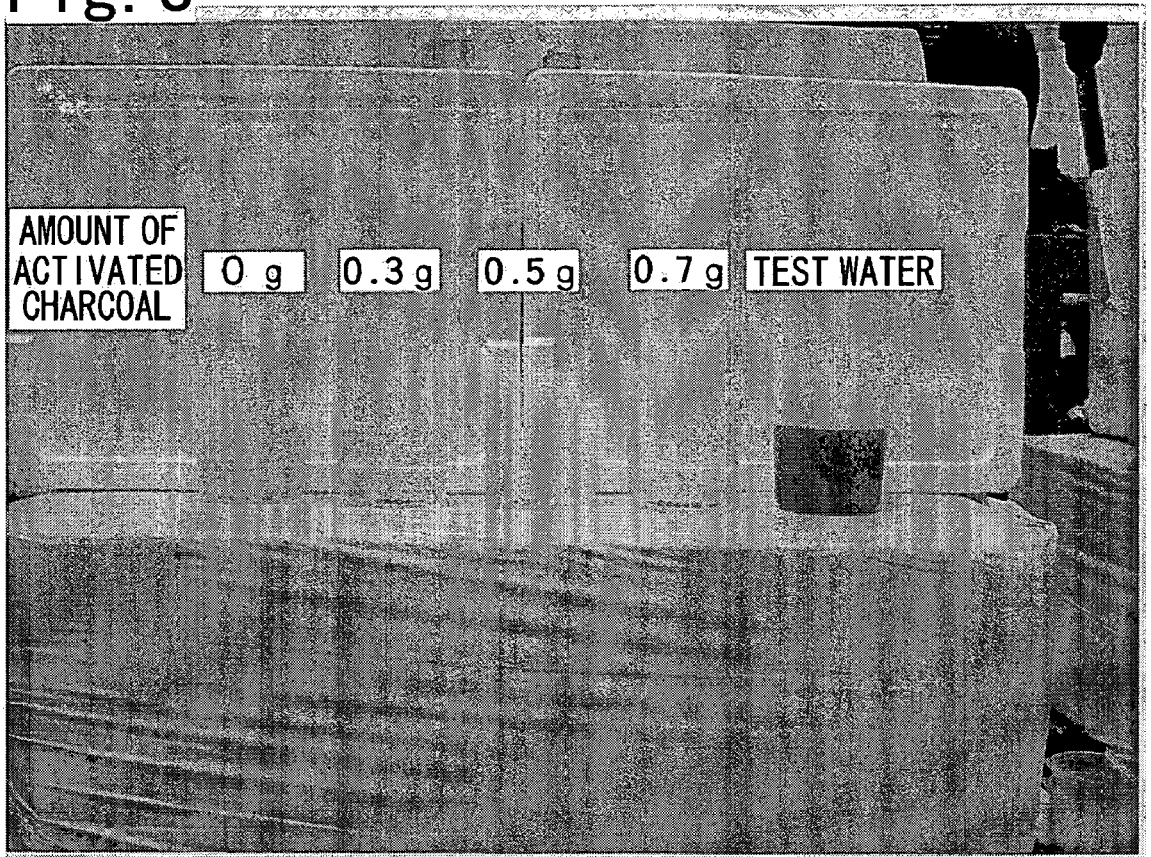
FIG. 8 is a photograph showing the state of reaction for each sample in the case of adding activated charcoal in different amounts.

Naturally, the higher the amount of activated charcoal added, the greater the decolorization effect. This could be seen by visual observation, and can also be confirmed through the data. With the sample for which activated charcoal was not added on the far left of FIG. 8, it can be seen that the sample is slightly colored; the transmittance of the filtrate was 75%. With the second sample from the left for which 0.3 g of activated charcoal was added, it can be seen that slight coloring remained; the transmittance of the filtrate was 86.8%. With the third sample for which 0.5 g of activated charcoal was added, it can just be seen that the liquid is cloudy if one looks carefully; the transmittance of the filtrate was 88%. With the fourth sample for which 0.7 g of activated charcoal was added, the liquid was like colorless transparent water; the transmittance of the filtrate was 91.5%. The higher the amount of activated charcoal the better the results, but in actual practice the amount of activated charcoal should be set as appropriate taking cost effectiveness into consideration in accordance with the way of reusing the filtrate. Incidentally, the sample on the far right in FIG. 8 is the test liquid before carrying out the treatment of the present invention; the color cannot be appreciated from FIG. 8, but the test liquid was a brown suspension, with the transmittance being 23.8%.

EXPERIMENT 6

Treatment of the present invention was carried out, and the biochemical oxygen demand (BOD), the chemical oxygen demand (COD) and the solid foreign matter content (suspended solids, SS) of the filtrate ultimately discharged were measured; the data is shown in Table 6.

TABLE 6

| Sample | Test water | A | B | C | D | E | F | G | H | I |
|---|---|---|---|---|---|---|---|---|---|---|
| Amount of old paper added (kg/m$^3$) | — | | | 0 | | 0.5 | 1.0 | 2.0 | 0.5 | 0.5 |
| Amount of F.P. added (ppm) (without relative density conversion) | — | | 2000 | | | 2000 | | | 500/1500 | 2000 |
| Amount of F.P. added (mg/l) (after relative density conversion) | — | | 2900 | | | 2900 | | | 725/2175 | 2900 |
| PH | 8.1 | 3.9 | 4.5 | 5.0 | 5.5 | | 4.5 | | 4.5 | 4.5 |
| Polymeric coagulent | — | | | | | NP780 | | | | |
| Type of coagulent | — | | | | | Nonionic | | | | |
| Amount added (ppm) | — | | | | 10 | | | | 10 | 2.5/7.5 |
| Floc production | — | ○ | ○ | ○ | ○ | ○ | ○ | Δ○ | ○ | ○ |
| Color removal (transmittance T (%)) | 21.7 | 78.0 | 81.3 | 80.0 | 78.8 | 80.9 | 81.3 | 81.8 | 80.8 | 82.3 |
| Dewaterability | — | ○ | ○ | Δ○ | Δ○ | ◎ | ◎ | ◎ | ○◎ | ○◎ |
| BOD (mg/l) | 115 | 6.0 | 6.0 | 9.6 | 4.8 | 7.2 | 10.0 | 10.8 | 10.8 | 18.0 |
| COD (mg/l) | 520 | 216 | 265 | 275 | 270 | 265 | 265 | 280 | 260 | 265 |
| SS (mg/l) | 325 | 10 | 8 | 10 | 8 | 13 | 25 | 20 | 34 | 9 |
| Water content after dewatering (%) | — | 85.2 | 85.4 | 86.8 | 87.8 | 75.6 | 70.9 | 69.4 | — | — |
| Evaluation | | ○ | ○ | | | ○◎ | ◎ | ◎ | ○◎ | ○◎ |

※Test water: 500 ml (jar test put into a 500 ml glass beaker)
※※Relative density conversion for amount of ferric polysulfate added (mg/l): Calculated taking relative density to be 1.45
※※※Pressing conditions in measurement measurement of water content: 1 kg/cm$^2$, 30 sec For Sample H in this table, the amount added of the ferric polysulfate is written as '500/1500'; this means that two-stage treatment was carried out in which 500 ppm of ferric polysulfate was initially added and agitation was carried out, and then after 1 minute 1500 ppm of ferric polysulfate was added and agitation was carried out. Moreover, for Sample I, the amount added of the nonionic organic coagulant is written as '2.5/7.5'; this means that two-stage treatment was carried out in which 2.5 ppm of the nonionic organic coagulant was initially added and agitation was carried out, and then after 1 minute 7.5 ppm of the nonionic organic coagulant was added and agitation was carried out. From these results, it can be seen that the decolorization effect was greatest with a transmittance of 82.3% for Sample I for which the treatment was carried out with the addition of the nonionic organic coagulant divided into two. Incidentally, it can be seen that the decolorization effect is 1.4% higher than for Sample E (transmittance 80.9%) for which the conditions were the same but the addition was completed in one go. Focusing on this point, further experiments were carried out, whereupon it was ascertained that this effect was not due to carrying out the addition of the nonionic organic coagulant divided into two but rather due to carrying out the addition of the nonionic organic coagulant after the first reaction brought about by adding the ferric polysulfate.

Figure 9:
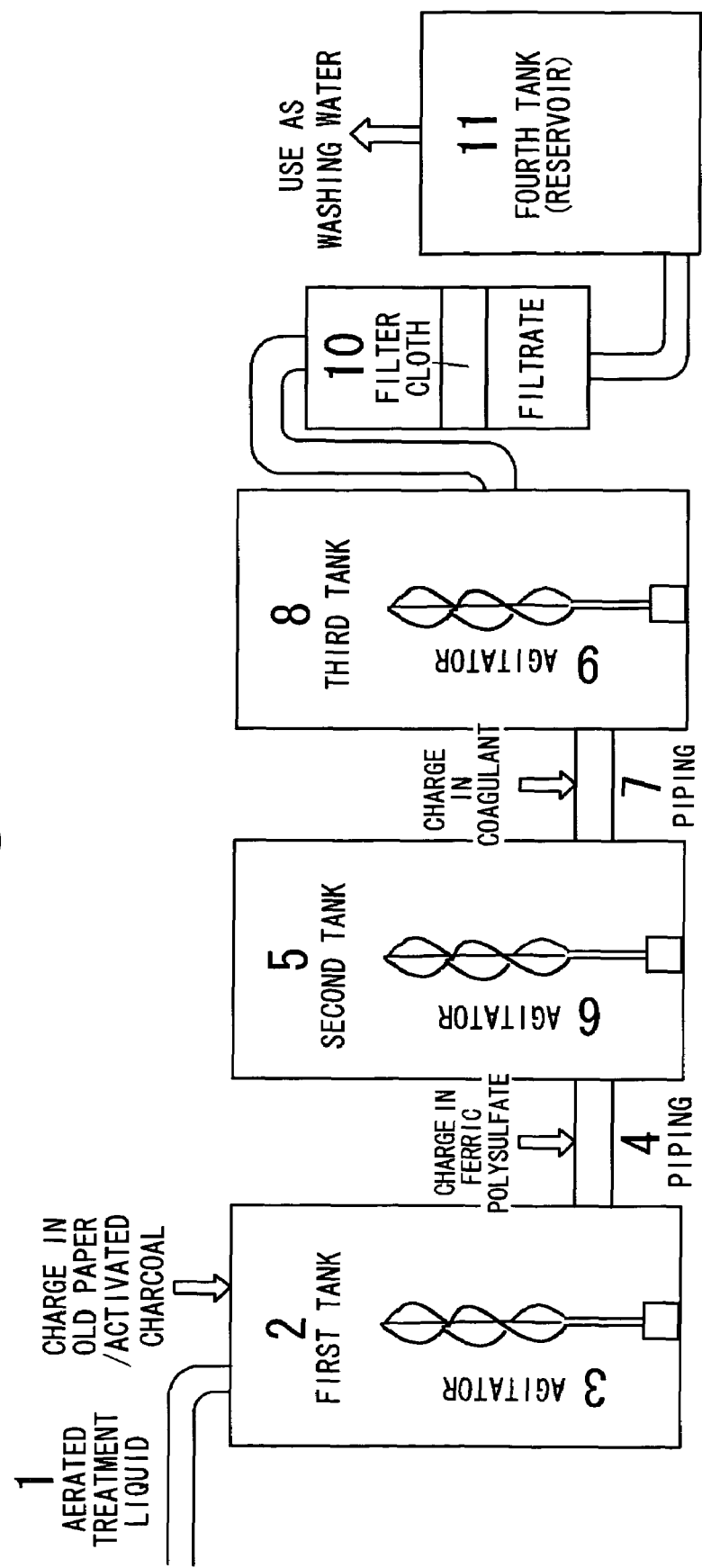
FIG. 9 is a drawing showing an example of a system for carrying out a method of decolorizing stock-raising treatment water according to the present invention.
Figure 10:
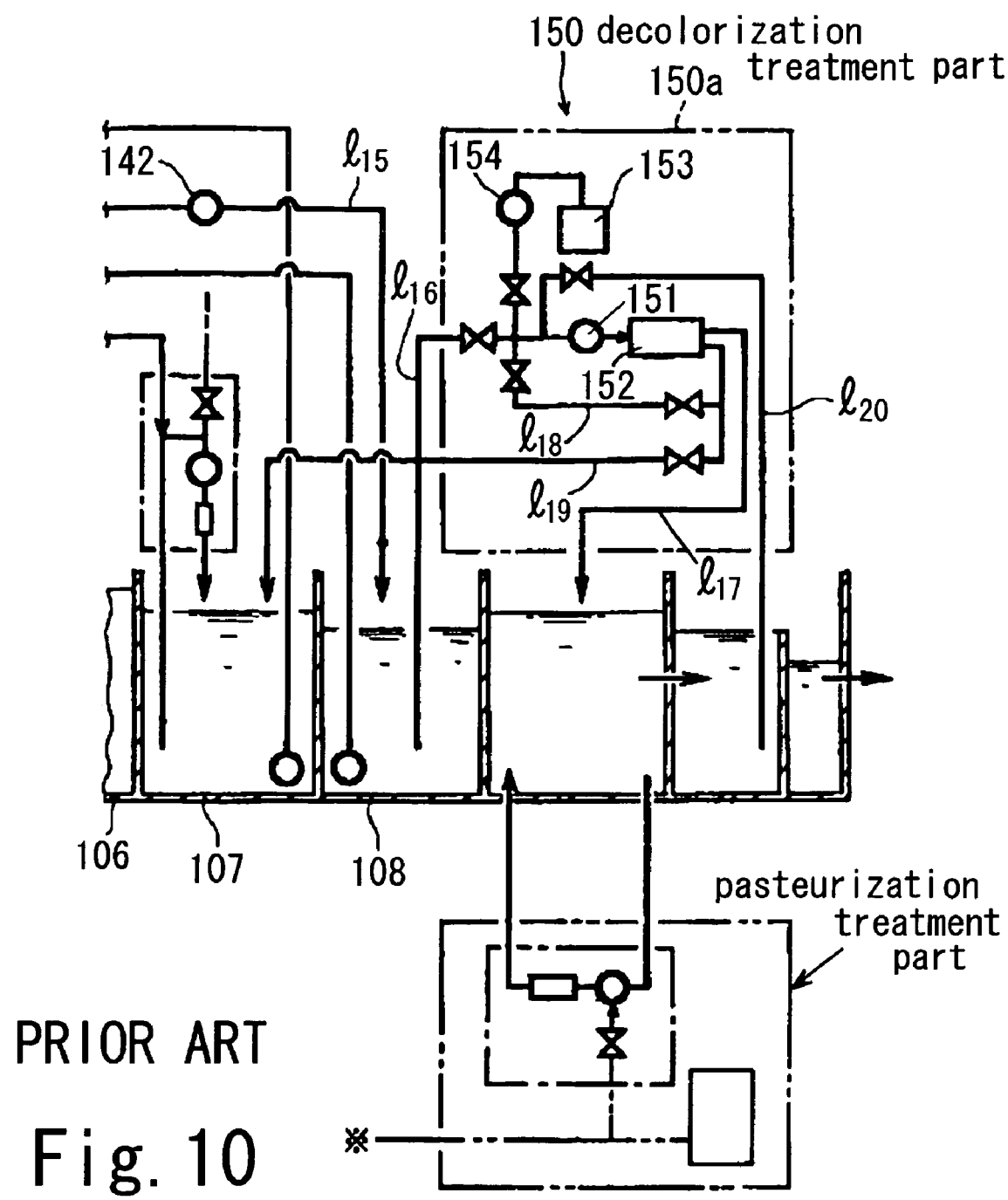
FIG. 10 is a drawing showing decolorizing means in a conventional stock-raising treatment water purification facility.

An optimum working example will now be given based on the above experimental results. This working example assumes reuse of the filtrate as washing water in a piggery. As shown in FIG. 9, there is a first tank 2 into which is introduced a liquid that has been obtained by subjecting raw water 1, which is stock-raising treatment water, to aeration treatment in a purifier tank. 1 kg of old paper and 5 kg of activated charcoal per 1 m$^3$ of the treatment liquid are charged into this first tank, and agitation is carried out by an agitator 3. The homogenized liquid is fed into a second tank 5 through piping 4, and part way along this piping ferric polysulfate is injected in such that the concentration thereof becomes 2000 ppm. Agitation is carried out by an agitator 6 in the second tank 5, and once the reaction has died down, the liquid is fed into a third tank 8 through piping 7, and part way along the piping 7 a nonionic coagulant (NP780) is injected in such that the concentration thereof becomes 10 ppm. Agitation is carried out by an agitator 9 in the third tank 8, and once the reaction has died down, the liquid is passed through a filter cloth 10 to remove the solid component. The filtrate is stored in a fourth tank 11, and reused as washing water as appropriate. If the amount of treated water exceeds the required amount of washing water, then the overflow is discharged into a public drain as appropriate.

What is claimed is:

1. A method of decolorizing a liquid, comprising the steps in the recited order:
    adding old paper and activated charcoal to a treatment liquid that has been obtained by subjecting raw water that is stock raising treatment water to aeration treatment in a purifier tank to adsorb fine fibrous,
    adding ferric polysulfate to the treatment liquid and agitating to bring about reaction to coagulate said colorant components,
    adding a nonionic or anionic organic coagulant to the treatment liquid,
    agitating the treatment liquid to bring about a reaction and a decolorization effect, and thus separate said treatment liquid into solid and liquid components; and
    removing the solid components.

2. The method of decolorizing a liquid according to claim 1, wherein the ferric polysulfate is added in an amount such that the concentration thereof becomes 500 to 2,000 ppm, and the nonionic or anionic organic coagulant is added in an amount such that the concentration thereof becomes at least 10 ppm.

* * * * *